US009032267B2

(12) United States Patent
Shimanuki et al.

(10) Patent No.: US 9,032,267 B2
(45) Date of Patent: *May 12, 2015

(54) MULTICARRIER MOBILE COMMUNICATION SYSTEM

(71) Applicant: NEC Corporation, Minato-ku, Tokyo (JP)

(72) Inventors: Noriyuki Shimanuki, Tokyo (JP);
Kouichi Tamura, Tokyo (JP);
Toshimichi Yokote, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,588

(22) Filed: Apr. 15, 2013

(65) Prior Publication Data

US 2013/0294357 A1 Nov. 7, 2013

Related U.S. Application Data

(63) Continuation of application No. 12/665,800, filed as application No. PCT/JP2008/061879 on Jul. 1, 2008, now Pat. No. 8,539,298.

(30) Foreign Application Priority Data

Jul. 4, 2007 (JP) .................................. 2007-176240

(51) Int. Cl.
*H03M 13/00* (2006.01)
*H04W 72/04* (2009.01)
(Continued)

(52) U.S. Cl.
CPC ......... *H04W 72/0466* (2013.01); *H04L 1/1858* (2013.01); *H04J 13/18* (2013.01);
(Continued)

(58) Field of Classification Search
CPC ................... H03M 13/2951; H03M 13/1128; H03M 13/2975; H04L 1/1128; H04L 1/1858
USPC ................................... 714/750, 751, 748, 794
See application file for complete search history.

(56) References Cited

U.S. PATENT DOCUMENTS 6,233,709 B1 * 5/2001 Zhang et al. .................. 714/774
6,990,627 B2 * 1/2006 Uesugi et al. ................. 714/794
(Continued)

FOREIGN PATENT DOCUMENTS

| JP | 2001-156711 A | 6/2001 |
| JP | 2005-223620 A | 8/2005 |
| WO | 2004/112288 A1 | 12/2004 |

OTHER PUBLICATIONS

The Extended European Search Report for EP Application No. 08777730.6 dated on Oct. 18, 2013.
(Continued)

*Primary Examiner* — Joshua Lohn
(74) *Attorney, Agent, or Firm* — Sughrue Mion, PLLC (57) ABSTRACT

A transmitting unit divides a transmit data into a plurality of code blocks, and encodes each of the plurality of code blocks to generate a transmission signal. The transmitting unit transmits the transmission signal, and a receiving unit receives the transmission signal as a reception signal. The receiving unit, when being an error in the reception signal, transmits a retransmission request feedback data which contains a NACK data and a data indicating the first code block group to the transmitting unit. First resources are assigned for each of the plurality of code blocks of the transmission signal. The transmitting unit assigns resources of the first code block group of the plurality of code blocks of the transmission signal to second resources which are fewer than the first resources, based on the retransmission request feedback data, and retransmits the transmission signal to the receiving unit.

4 Claims, 5 Drawing Sheets

(51) Int. Cl.
*H04L 1/18* (2006.01)
*H04L 1/00* (2006.01)
*H04J 13/18* (2011.01)
*H04L 1/16* (2006.01)

(52) U.S. Cl.
CPC ........... *H04L 1/0003* (2013.01); *H04L 1/0009* (2013.01); *H04L 1/0026* (2013.01); *H04L 1/005* (2013.01); *H04L 1/0066* (2013.01); *H04L 1/1671* (2013.01); *H04L 1/1812* (2013.01); *H04L 1/0013* (2013.01)

(56) References Cited

U.S. PATENT DOCUMENTS

| | | | | |
|---|---|---|---|---|
| 8,015,468 | B2* | 9/2011 | Krouk et al. | 714/752 |
| 8,316,275 | B2* | 11/2012 | Oosuge | 714/758 |
| 8,539,298 | B2* | 9/2013 | Shimanuki et al. | 714/751 |
| 2003/0118031 | A1* | 6/2003 | Classon et al. | 370/395.54 |
| 2003/0167433 | A1* | 9/2003 | Wengerter et al. | 714/749 |
| 2004/0006734 | A1 | 1/2004 | Shin et al. | |
| 2004/0203456 | A1* | 10/2004 | Onggosanusi et al. | 455/67.13 |
| 2005/0022101 | A1* | 1/2005 | Malm et al. | 714/801 |
| 2005/0053040 | A1* | 3/2005 | Choi et al. | 370/335 |
| 2006/0123324 | A1* | 6/2006 | Cudak et al. | 714/776 |
| 2006/0251185 | A1* | 11/2006 | Von Elbwart et al. | 375/298 |
| 2007/0124657 | A1* | 5/2007 | Orio | 714/794 |
| 2009/0031183 | A1* | 1/2009 | Hoshino et al. | 714/748 |

OTHER PUBLICATIONS

Samsung, "Analysis of per code block CRC and per transport block CRC," 3GPP TSG RAN WG 1 Meeting #49-bis, RI-073108, Jun. 25-29, 2007, Orlando, [internet] <http://www.3gpp.orgfitp/tsg_ran/WG1_RL1/TSGR1_49b/Docs/R1-073108.zip> Cited in JP Office Action.

Japanese Office Action for JP Application No. 2013-063507 mailed on Feb. 20, 2014 with English Translation.

* cited by examiner

| CQI \ DECODING ITERATION COUNT | EARLY TERMINATION | FORCIBLY TERMINATION |
|---|---|---|
| HIGH (CHANNEL QUALITY: GOOD) | RB ASSIGNMENT LESS, DTX | HIGH ORDER MODULATION, LOW ENCODING RATE |
| LOW (CHANNEL QUALITY: BAD) | RB ASSIGNMENT LESS | QPSK, LOW ENCODING RATE |

MULTICARRIER MOBILE COMMUNICATION SYSTEM

This patent application is a continuation application of Ser. No. 12/665,800 filed on Mar. 4, 2010 and claims the benefit of priority from prior the National Phase of PCT/JP2008/061879, filed Jul. 1, 2008, which is based on Japanese Patent Application No. 2007-176240 that was filed on Jul. 4, 2007, the entire contents of all of which are incorporated herein by reference.

TECHNICAL FIELD

The present invention relates to a multicarrier mobile communication system, which is provided with a transmitting apparatus and a receiving apparatus connected to a radio network.

BACKGROUND ART

In recent years, in a multicarrier mobile communication system, a system for accessing a large volume of data at a high speed has been developed. In addition, in the multicarrier mobile communication system, a low delay is also required. If these demands are met, it becomes possible to realize various applications that require real time property and this increases the possibility that various services can be developed.

The multicarrier mobile communication system is provided with a transmitting apparatus and a receiving apparatus that are connected to a radio network. For example, the transmitting apparatus is used as a base station apparatus that is placed in a base station, and the receiving apparatus is used as a mobile terminal that is utilized by a user. A Hybrid Automatic Repeat Request (HARQ) method is applied to the transmitting apparatus and the receiving apparatus. According to the HARQ method, at first, adding a Cyclic Redundancy Check (CRC) bit to a transmission signal in advance, the transmitting apparatus transmits the transmission signal. The reception signal receives this transmission signal as a reception signal. By using the CRC bit that has been added to the reception signal, the receiving apparatus carries out a retransmission request for the transmission signal when the reception signal has an error.

However, in the multicarrier mobile communication system, a retransmission efficiency is not good while a low delay is requested. One reason for this is in that a scheduling upon retransmission of the transmission signal is made in a constant iteration pattern. In other words, a retransmission request for the transmission signal is carried out on the basis of a CRC execution result. In this case, retransmission occurs in units of addition of the CRC bit (a CRC additional unit) to the transmission signal each time. For example, when the CRC bit is added in units of code word of the transmission signal, retransmission of the transmission signal occurs in the same size each time regardless of the rate at which errors are included in the code word. Accordingly, the retransmission efficiency is not good when the rate that the errors are included in the code word is low.

In conjunction with the above description, technique related to the mobile communication will be described below.

In Japanese Patent Application Publication (JP 2006-211017A), a base station apparatus, a communication terminal, and a resource allocation method are disclosed, which are used for a radio communication system. Comparing MCS levels requested from respective communication terminals during communication, a communication terminal being a data transmission destination is allocated in the resource allocation method. Next, a modulation system and a coding rate of the data to be transmitted to the allocated communication terminal are determined on the basis of the MCS level requested from the allocated communication terminal, an error detecting process result in the allocated communication terminal, and the number of times of iteration of an error correction decoding process that has been carried out in the allocated communication terminal.

In Japanese Patent Application Publication (JP 2007-006382A), a receiving apparatus is disclosed. The receiving apparatus receives a frame including a code block. Next, the receiving apparatus determines a maximum number of times of iteration of each code block on the basis of the size of the code block within the receiving frame and an allowable time about the error correction decoding process of the entire receiving frame. Then, the receiving apparatus iteratively executes the error correction decoding process on each code block with the determined maximum number of times of iteration as an upper limit.

In Japanese Patent Application Publication (JP 2007-043681A), a communication system is disclosed. The communication system communicates with other station via a base station that is connected to a network. The base station divides a packet to be transmitted into a plurality of radio transfer blocks. Then, a priority is determined on the basis of an integration value for the size of each radio transfer block of which delivery confirmation is obtained, and radio resources are assigned to the radio transfer blocks of the packet to be transmitted on the basis of the determined priority. Then, the assigned radio resources are used to transmit the radio transfer blocks. In the mobile station, when the radio transfer blocks are normally received from the base station, a delivery confirmation is transmitted to the base station. When the radio transfer blocks are not normally received from the base station, a retransmission request is transmitted to the base station. Then, a packet is reproduced from radio transfer blocks that are received from the base station.

In Japanese Patent Application Publication (JP 2000-101453A), a decoding apparatus is disclosed. The decoding apparatus serves to decode a plurality of coded messages each having an associated corruption level. The decoding apparatus determines a level of corruption of each message and generates data describing a signal processing requirement amount for decoding each message. Then, the decoding apparatus assigns the messages to decoders depending on the data describing the signal processing requirement amount.

In Japanese Patent Application Publication (JP 2006-121244A), a mobile communication system is disclosed. In response to a propagation quality of a downlink channel from a base station to a mobile station, the mobile communication system determines a transmission system of transmission data of this downlink channel. Measuring the propagation quality, the mobile station turbo-decodes the transmission data. Then, in response to the number of times of iteration of the turbo decoding, the mobile station corrects the propagation quality and notifies the correction to the base station.

In Japanese Patent Application Publication (JP 2004-112800A), an adaptive hybrid automatic retransmission request method is disclosed.

In Japanese Patent Application Publication (JP 2005-184809A), a data transmission method using a hybrid automatic repetitive request in a multicarrier system is disclosed.

DISCLOSURE OF INVENTION

In the above-described multicarrier mobile communication system, a retransmission efficiency is not good. Accordingly, the object of the present invention is to provide a multicarrier mobile communication system which can improve an efficiency per retransmission.

The multicarrier mobile communication system of the present invention is provided with a transmitting unit and a receiving unit that are connected to a radio network. The transmitting unit is provided with a coding section and a transmitting section. The coding section divides a transmission data into a plurality of code blocks and encodes each of the plurality of code blocks to generate a transmission signal. The transmitting section transmits a transmission signal. The receiving unit is provided with a receiving section and a decoding section. The receiving section receives the transmission signal as a reception signal. The decoding section performs iterative decoding, in which error correction decoding and error detection are repetitively performed, to each of the plurality of code blocks of the reception signal. The decoding section terminates the iterative decoding to a first coding block group, in which an error has not been detected before a first predetermined number of times of iteration, among the plurality of code blocks of the reception signal. When the reception signal has an error, the receiving section transmits an NACK data indicating that the transmission signal has an error, and a retransmission request feedback data including a data representing the first code block group to the transmitting unit. First resources are assigned to each of the plurality of code blocks of the transmission signal. The transmitting section assigns the resources of the first code block group to second resources that are fewer than the first resources among the plurality of code blocks of the transmission signal in response to the retransmission request feedback data to retransmit the transmission signal to the receiving apparatus.

BRIEF DESCRIPTION OF DRAWINGS

The above-described object, effect, and features of the present invention will become clearer from the description of the exemplary embodiments in association with the following drawings.

BEST MODE FOR CARRYING OUT THE INVENTION

Hereinafter, a multicarrier mobile communication system according to the present invention will be described in detail with reference to the attached drawings. The multicarrier mobile communication system according to an exemplary embodiment of the present invention is applied to an Orthogonal Frequency Division Multiple Access (OFDMA) system or a Single Carrier-Frequency Division Multiple Access (SC-FDMA) system.

Figure 1:
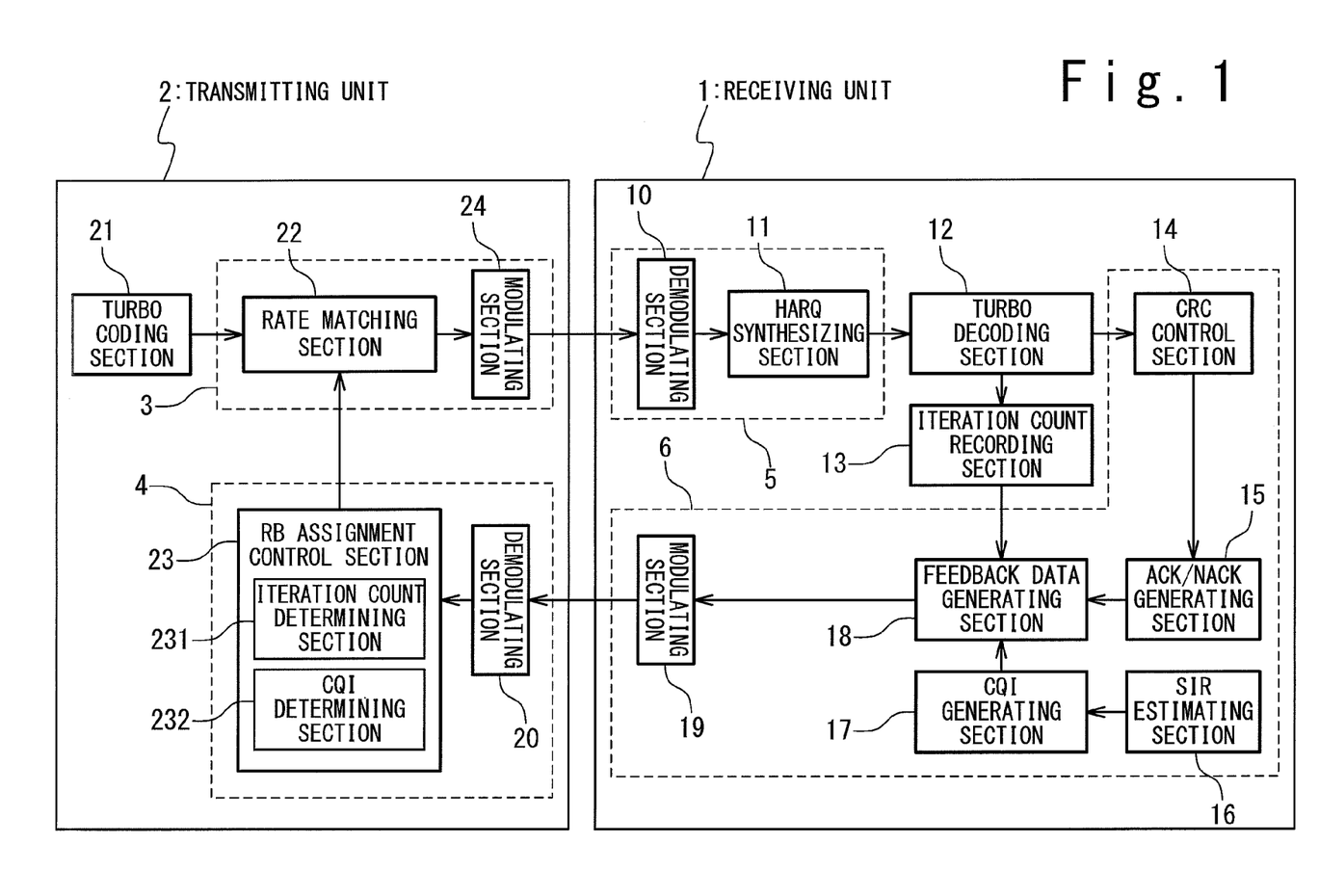
FIG. 1 illustrates a configuration of a multicarrier mobile communication system according to an exemplary embodiment of the present invention.

FIG. 1 illustrates a configuration of the multicarrier mobile communication system according to the exemplary embodiment of the present invention. The multicarrier mobile communication system according to the exemplary embodiment of the present invention is provided with a receiving unit 1 and a transmitting unit 2 that are connected to a radio network. For example, the receiving unit 1 is used as a mobile terminal by a user, and the transmitting unit 2 is used as a base station apparatus that is provided in the base station.

The receiving unit 1 is provided with a receiving unit, a turbo decoding section 12, and an iteration count recording section 13. The receiving unit is provided with a reception processing section 5, which receives a transmission signal as a reception signal, to be described later, and a reception processing section 6 that requests retransmission of the transmission signal when there is an error in the reception signal. The reception processing section 5 is provided with a demodulating section 10 and a Hybrid Automatic Repeat Request (HARQ) synthesizing section 11. The reception processing section 6 is provided with a CRC control section 14, an ACK/NACK generating section 15, a SIR estimating section 16, a CQI generating section 17, a feedback data generating section 18, and a modulating section 19.

The reception processing sections 5 and 6, the turbo decoding section 12, and the iteration count recording section 13 can be realized by a circuit or a computer program. In the case of the computer program, the receiving unit 1 serves as a computer and it is provided with an executing section (not illustrated) that serves as a Central Processing Unit (CPU) and a memory section (not illustrated) that serves as a recording medium. In the recording medium of the receiving unit 1, the computer program to be executed by the computer is stored. The executing section of the receiving unit 1 reads the computer program from the recording medium of the receiving unit 1 upon starting and executes the computer program.

The transmitting unit 2 is provided with a transmitting section and a turbo coding section 21. A transmitting section is provided with a transmission processing section 3 that transmits a transmission signal and a transmission processing section 4 that controls the transmission processing section 3 when retransmission of the transmission signal is requested. The transmission processing section 3 is provided with a rate matching section 22 and a modulating section 24. The transmission processing section 4 is provided with a demodulating section 20 and a Resource Block (RB) assignment control section 23. The RB assignment control section 23 is provided with an iteration count determining section 231 and a CQI determining section 232.

The transmission processing sections 3 and 4, and the turbo coding section 21 can be realized by a circuit or a computer program. In the case of the computer program, the transmitting unit 2 is a computer and provided with an executing section (not illustrated) as a CPU and a memory section (not illustrated) as a recording medium. In the memory section of the transmitting unit 2, a computer program to be executed by the computer is stored. The executing section of the transmitting unit 2 reads a computer program from the memory section of the transmitting unit 2 upon starting and executes the computer program.

Figure 5:
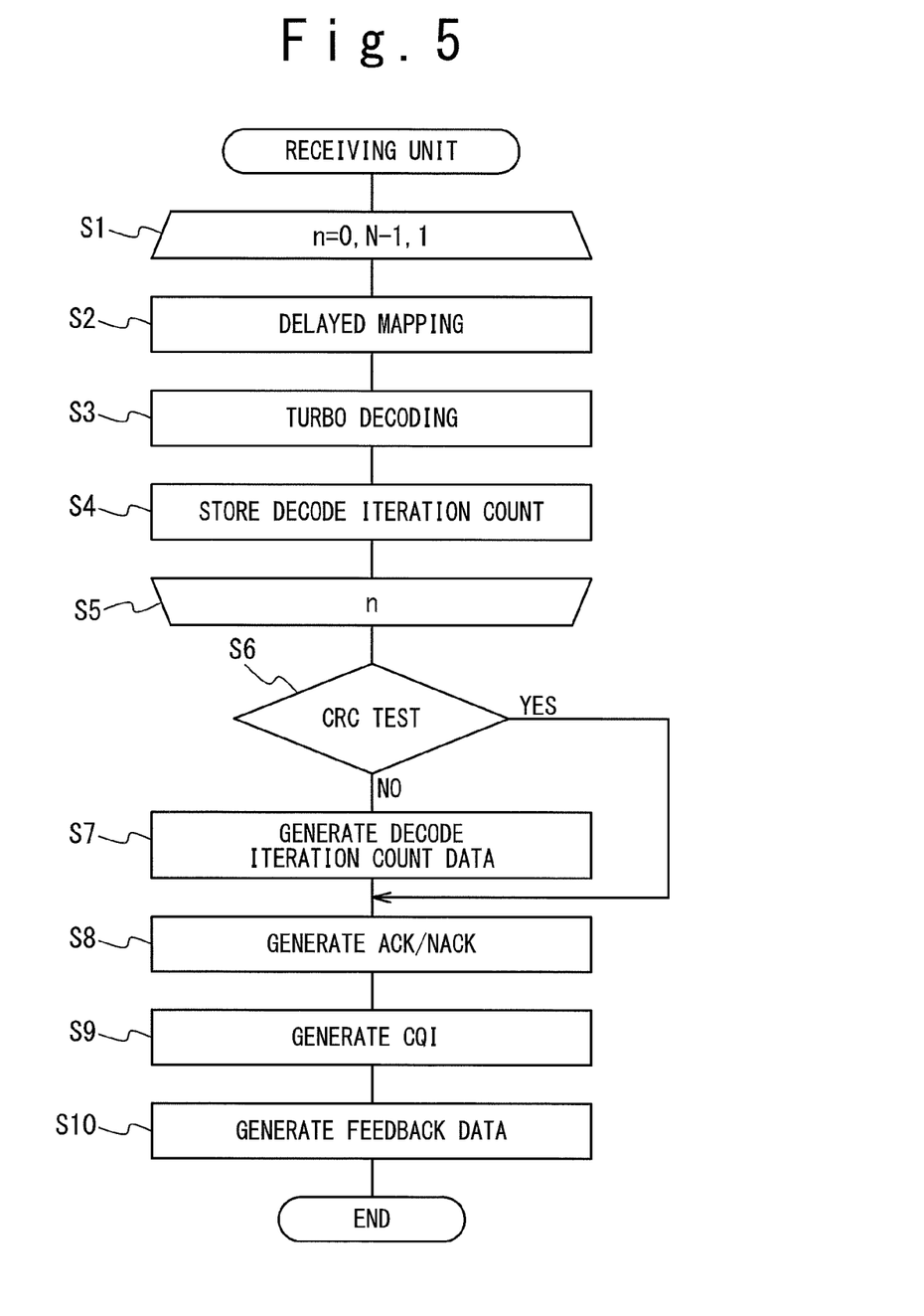
FIG. 5 is a flow chart showing an operation of the receiving unit of the multicarrier mobile communication system according to the exemplary embodiment of the present invention.
Figure 6:
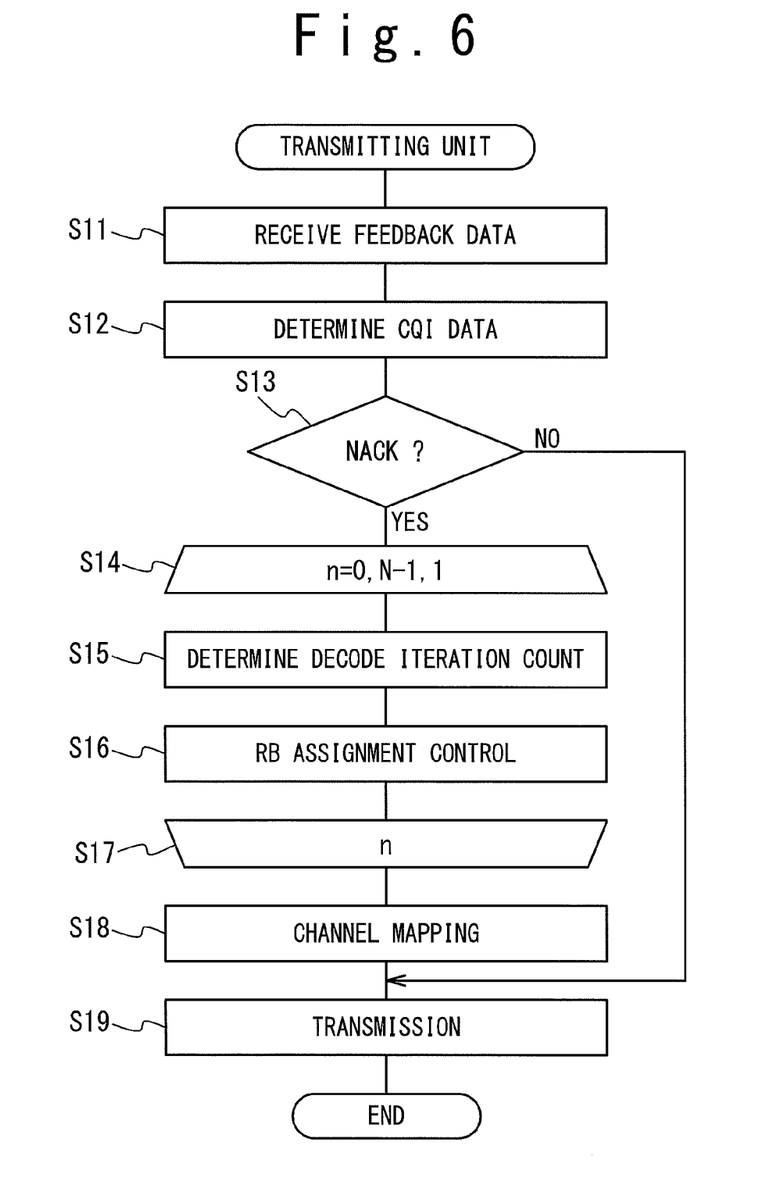
FIG. 6 is a flow chart showing an operation of the transmitting unit of the multicarrier mobile communication system according to the exemplary embodiment of the present invention.

FIG. 5 is a flow chart showing an operation of the receiving unit 1, and FIG. 6 is a flow chart showing an operation of the transmitting unit 2.

At first, the transmitting unit 2 transmits a transmission signal to the receiving unit 1, and the transmitting unit 2 retransmits the transmission signal in response to a NACK signal from the receiving unit 1. This will be described below.

Figure 2A:
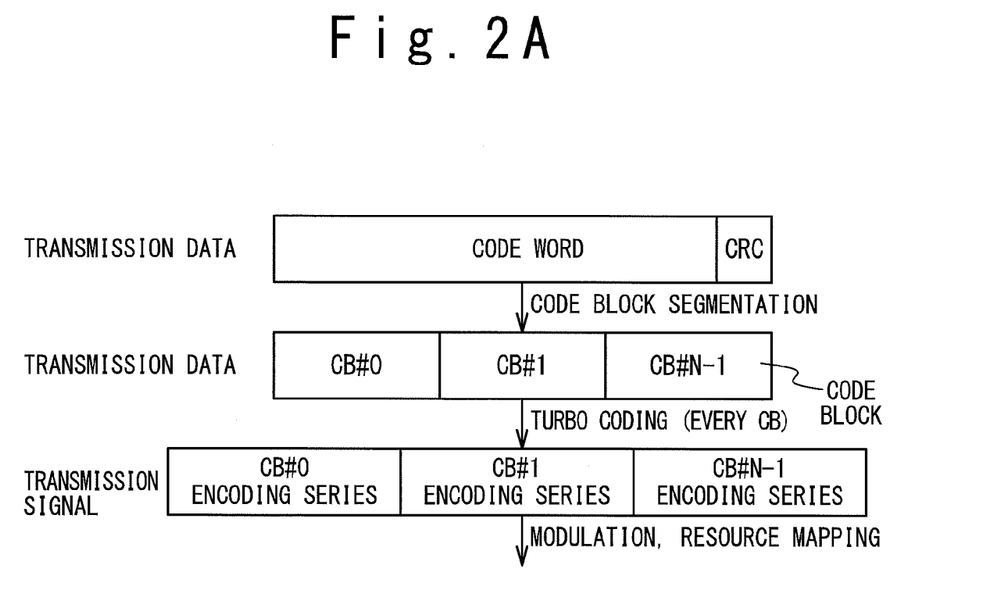
FIG. 2A illustrates a transmission data, divided transmission data, and a transmission signal that is processed by a transmitting unit of the multicarrier mobile communication system according to the exemplary embodiment of the present invention.

In the transmitting unit 2, the turbo coding section 21 performs turbo coding on a transmission data. Here, as shown in FIG. 2A, the transmission data includes a plurality of bits representing a code word and Cyclic Redundancy Check (CRC) bits to be applied to the code word. In addition, for example, in a 3GPP, the permissible number of bits that can be coded is determined in advance to be 6,114 bits at a maximum. Therefore, the transmitting unit 2 encodes the transmission data after dividing the transmission data (a code block segmentation) when the number of bits of the transmission data to be transmitted to the receiving unit 1 is more than the above-described permissible number of bits. Therefore, the turbo coding section 21 divides the transmission data into N code blocks from a $0^{th}$ code block to an $(N-1)^{th}$ code block (N is an integer equal to or more than 1). Each of the N code blocks is a unit of error correction coding in radio resources (hereinafter, to be referred to as resources), and is assigned with first resources as resources (time and frequency). For example, the first resources correspond to a first bit group including redundancy bits for error correction, and the redundancy bits for error correction includes a first parity bit and a second parity bit. The turbo coding section 21 performs turbo coding to each of the N code blocks of the transmission data to generate a transmission signal and outputs it to the rate matching section 22. The transmission signal includes the N code blocks that are coded by the turbo coding. The rate matching section 22 performs the rate matching on the transmission signal to output to the modulating section 24.

The modulating section 24 performs an Adaptive Modulation and Coding (AMC) on the basis of a CQI value (to be described later) to the transmission signal to map the transmission signal to the downlink channel and transmits it to the receiving unit 1 via the radio network.

Figure 2B:
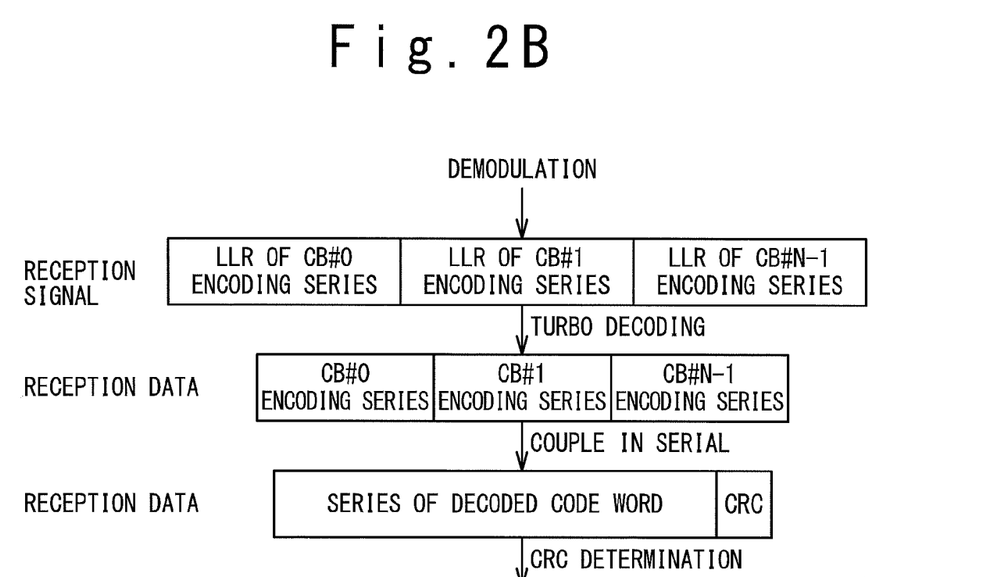
FIG. 2B illustrates a reception signal, divided reception data, and a reception data that is processed by a receiving unit of the multicarrier mobile communication system according to the exemplary embodiment of the present invention.

In the receiving unit 1, the demodulating section 10 receives the transmission signal from the transmitting unit 2 (step S1). The demodulating section 10 performs demodulation and de-rate matching to the transmission signal to generate a reception signal, and outputs it to the turbo decoding section 12 via the HARQ synthesizing section 11 (step S2). As shown in FIG. 2B, the reception signal includes the above-described N code blocks that have been encoded. The HARQ synthesizing section 11 includes a storage section (not illustrated), and stores the reception signal in the storage section as a previous reception signal.

The turbo decoding section 12 performs turbo decoding on each of the N code blocks of the reception signal to generate a reception data, and outputs the reception data to the CRC control section 14 (step S3). As shown in FIG. 2B, the reception data includes the N code blocks that are decoded by the turbo decoding.

Here, iterative decoding and early termination of iteration will be described.

In the case of performing the encoding such as the turbo coding to the N code blocks in the transmitting unit, the receiving unit iteratively performs error correction decoding such as turbo decoding on the N code blocks of the reception signal (synthesized reception signal). This is referred to as iterative decoding, and an error rate is improved by performing the iterative decoding.

In the iterative decoding, the error correction decoding is repeated to the defined number of times of iteration by which a desired error rate can be realized. However, as the number of times of iteration increases more, a calculation amount increases more, so that a power consumption amount also increases. Therefore, the receiving unit performs the error correction decoding on the N code blocks of the reception signal, and performs error detection. In the iterative decoding, the error correction decoding and the error detection are iteratively performed. The receiving unit immediately terminates the iterative decoding when no error is detected. Thus, when no error is detected, the iterative decoding is terminated even before the defined number of times of iteration. This is referred to as an early termination or an early termination of iteration, and by performing the early termination of iteration, it is possible to decrease the power consumption amount.

However, the defined number of times of iteration to each of the N code blocks is determined in advance in accordance with the code block, whose error bit number is a predetermined number or more, and is used as the above-described constant iteration pattern. Therefore, the defined number of times of iteration is tendency to be excessive to code block whose error bit number is fewer than the predetermined number. In this way, the transmission signal of a same size (the number of bits) is retransmitted to each of the N code blocks of the transmission signal regardless of the number of error bits. Therefore, when the number of error bits is few, the efficiency of retransmission is degraded. According to the present invention, the efficiency of retransmission is improved.

At step S3, the turbo decoding section 12 performs iterative decoding to the N code blocks of the reception signal. That is, the turbo decoding section 12 iteratively performs the error correction decoding and the error detection. In this case, the turbo decoding section 12 performs early termination of iteration to terminate the iterative decoding to a first code block group of the N code blocks, and in which group an error has not been detected before a first setting number of times of iteration of decoding. The turbo decoding section 12 forcibly terminates the iterative decoding for a second code block group among the N code blocks, in which group an error is detected even after a second setting number of times of iteration of decoding. The second setting number of times of iteration is the defined number of times of iteration, and is more than the first setting number of times of iteration.

The iteration count recording section 13 counts a decoding iteration count, i.e., the number of times of the iterative decoding to each of the N code blocks of the reception signal by the turbo decoding section 12, and records these N counts (step S4).

The above-described steps S2 to S4 are performed to each of the N code blocks (step S5). The CRC control section 14 combines the N code blocks of the reception data from a $0^{th}$ code block to an $(N-1)^{th}$ code block in this order. As shown in FIG. 2B, the reception data includes a plurality of bits representing the above-described decoded code word and the above-described CRC bits.

The CRC control section 14 executes CRC to the reception data and outputs a CRC execution result indicating whether the reception data has an error (there is an error bit(s) or not) to the ACK/NACK generating section 15 (step S6).

Here, it is assumed that the CRC execution result represents that the reception data has an error (step S6—NO). In this case, the feedback data generating section 18 generates a decoding iteration count data indicating N decoding iteration counts recorded in the iteration count recording section 13. Here, a first group of decoding iteration counts of the N decoding iteration counts is fewer than the first setting number of times of iteration as described above. That is, the first group of decoding iteration counts corresponds to the first code block group. A second group of decoding iteration counts of the N decoding iteration counts is equal to the second setting number of times of iteration as described above. That is, the second group of decoding iteration counts corresponds to the second code block group. Thus, the decoding iteration count data includes a data representing the first code block group and a data representing the second code block group.

The ACK/NACK generating section 15 generates an NACK data indicating that an error has been detected in the transmission signal, in response to the CRC execution result, and outputs the NACK data to the feedback data generating section 18 (step S8).

The SIR estimating section 16 estimates a Signal to Interference Ratio (SIR) of a downlink channel pilot symbol, and outputs it to the CQI generating section 17. The CQI generating section 17 generates channel quality data representing a Channel Quality Indicator (CQI) value on the basis of the SIR and outputs it to the feedback data generating section 18 (step S9).

Figure 3:
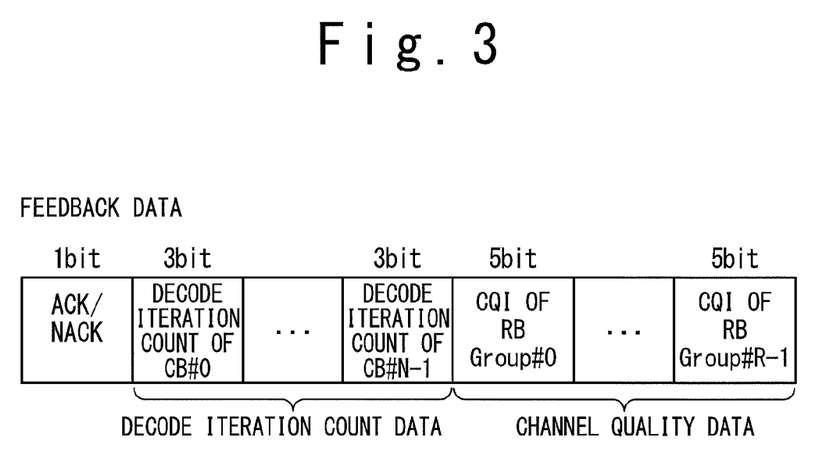
FIG. 3 illustrates feedback data that is transmitted from the receiving unit to the transmitting unit of the multicarrier mobile communication system according to the exemplary embodiment of the present invention.

The feedback data generating section 18 receives the NACK data from the ACK/NACK generating section 15. In this case, as shown in FIG. 3, the feedback data generating section 18 generates a feedback data (a retransmission request feedback data) including the NACK data, the decoding iteration count data, and the channel quality data outputted from the CQI generating section 17, and outputs the feedback data to the modulating section 19 (step S10).

At step S10, the modulating section 19 performs modulation on the retransmission request feedback data, to map to an uplink channel, and transmits the retransmission request feedback data to the transmitting unit 2 via the radio network. Here, the retransmission request feedback data is a retransmission request of the transmission signal since the retransmission request feedback data includes the NACK data.

Next, the transmitting unit 2 retransmits the transmission signal to the receiving unit 1, and transmits a new transmission signal in response to an ACK data transmitted from the receiving unit 1. This will be described below.

In the transmitting unit 2, the demodulating section 20 receives the retransmission request feedback data from the receiving unit 1 (step S11). The demodulating section 20 performs demodulation to the retransmission request feedback data to generate a reception signal and outputs it to the RB assignment control section 23 and the turbo coding section 21.

The turbo coding section 21 outputs a transmission signal to the rate matching section 22 in response to the NACK data included in the retransmission request feedback data.

The CQI determining section 232 of the RB assignment control section 23 determines and specifies the CQI value represented by the channel quality data included in the retransmission request feedback data, and outputs the CQI value to the modulating section 24 via the rate matching section 22 (step S12).

The NACK data is included in the retransmission request feedback data (step S13—YES). Therefore, the iteration count determining section 231 of the RB assignment control section 23 performs the following process (steps S14 and S15). At first, the iteration count determining section 231 selects the second group of decoding iteration counts representing the second setting number of times of iteration from among the N decoding iteration counts. In addition, the iteration count determining section 231 compares each of the N decoding iteration counts with the first setting number of times of iteration. Thus, the iteration count determining section 231 selects the first group of decoding iteration counts that are fewer than the first setting number of times of iteration from among the N decoding iteration counts. The iteration count determining section 231 outputs a reassignment instruction to the rate matching section 22 for assigning more resources to the second code block group corresponding to the second group of decoding iteration counts and assigning fewer resources to the first code block group corresponding to the first group of decoding iteration counts.

The rate matching section 22 performs the following process to the transmission signal outputted from the turbo coding section 21 in response to the reassignment instruction from the RB assignment control section 23 (step S16). At first, the rate matching section 22 assigns resources of the first code block group of the N code blocks of the transmission signal for second resources that are fewer than the above-mentioned first resources, and assigns resources of the second code block group for third resources that are more than the above-mentioned first resources. For example, the second resources correspond to a second bit group that is fewer than the first bit group corresponding to the first resources, and that includes redundancy bits for error correction. The third resources correspond to a third bit group that is more than the first bit group corresponding to the first resources, and that includes the redundancy bits for error correction. The rate matching section 22 assigns a bit group of the first code block group of the N code blocks of the transmission signal from the first bit group to the second bit group, and assigns a bit group of the second code block group from the first bit group to the third bit group such that a total number of bits of bit groups of the N code blocks of the transmission signal does not excess the above-described permissible number of bits.

The above-described steps S15 and S16 are performed to the first and second code block groups of the N code blocks of the transmission signal (step S17). The modulating section 24 applies AMC to the transmission signal on the basis of the CQI value, maps the transmission signal to the downlink channel (step S18), and transmits the transmission signal to the receiving unit 1 via the radio network (step S19). Thus, the transmitting unit 2 retransmits the transmission signal in response to the NACK data.

In the receiving unit 1, the demodulating section 10 receives the transmission signal from the transmitting unit 2 (step S1). The demodulating section 10 performs demodulation and de-rate matching to the transmission signal to generate a reception signal including the N code blocks, and outputs the generated reception signal to the HARQ synthesizing section 11 (step S2).

At step S2, the HARQ synthesizing section 11 synthesizes a plurality of bits of the reception signal (bit groups of the N code blocks) and a plurality of bits of a previous reception signal to generate a synthesized reception signal, and outputs the synthesized reception signal to the turbo decoding section 12. In addition, the HARQ synthesizing section 11 stores the reception signal in its storage section (not illustrated) as the previous reception signal.

The turbo decoding section 12 performs turbo decoding to each of the N code blocks of the reception signal to generate a reception data including the N code blocks, and outputs the reception data to the CRC control section 14 (step S3). At step S3, the turbo decoding section 12 performs iterative decoding to the N code blocks of the reception signal. The iteration count recording section 13 counts an iteration count, I.e. the number of times of the iterative decoding by the turbo decoding section 12 to each of the N code blocks of the reception signal, and records the N decoding iteration counts (step S4).

The above-described steps S2 to S4 are performed to each of the N code blocks of the reception signal (step S5). The CRC control section 14 combines the N code blocks of the reception data from the $0^{th}$ code block to the $(N-1)^{th}$ code block in this order and performs CRC. In this case, the reception data includes the plurality of bits representing the above-described decoded code word and the CRC bits. The CRC control section 14 executes the CRC to the reception data and outputs the CRC execution result to the ACK/NACK generating section 15 (step S6).

Here, it is assumed that the CRC execution result represents that the reception data has no error (step S6—YES). In this case, the ACK/NACK generating section 15 generates an ACK data indicating that no error is detected in the transmission signal, in response to the CRC execution result, and outputs the ACK data to the feedback data generating section 18 (step S8).

The SIR estimating section 16 estimates the SIR of the downlink channel pilot symbol and outputs the SIR to the CQI generating section 17. The CQI generating section 17 generates the channel quality data representing the CQI value on the basis of the SIR and outputs the channel quality data to the feedback data generating section 18 (step S9).

The feedback data generating section 18 receives the ACK data from the ACK/NACK generating section 15. In this case, the feedback data generating section 18 generates feedback data (new request feedback data) including the ACK data and the channel quality data outputted from the CQI generating section 17, and outputs the feedback data to the modulating section 19 (step S10).

At step S10, the modulating section 19 performs modulation to the new request feedback data to map it to the uplink channel, and transmits the new request feedback data to the transmitting unit 2 via the radio network. Here, the new request feedback data becomes a request for a new transmission signal since the new request feedback data includes the ACK data.

It should be noted that if the CRC execution result represents that there is no error in the reception data, the step S7 is skipped. In this case, when the mapping is performed to the new request feedback data at the step S10, an all-zero sequence is mapped to the number of times of iteration of decoding. As this mapping, a Discontinuous Transmission (DTX) or the like is utilized.

In the transmitting unit 2, the demodulating section 20 receives the new request feedback data from the receiving unit 1 (step S11). The demodulating section 20 performs demodulation to the new request feedback data to generate a reception signal and outputs the reception signal to the RB assignment control section 23 and the turbo coding section 21 of the transmitting unit 2.

The turbo coding section 21 outputs a new transmission signal to the rate matching section 22 in response to the ACK data included in the new request feedback data.

The CQI determining section 232 of the RB assignment control section 23 determines and specifies a CQI value represented by the channel quality data included in the new request feedback data, and outputs the CQI value to the modulating section 24 via the rate matching section 22 (step S12).

The ACK data is included in the retransmission request feedback data (step S13—NO). Therefore, the modulating section 24 applies AMC to the transmission signal on the basis of the CQI value, maps the transmission signal to the downlink channel, and transmits the transmission signal to the receiving unit 1 via the radio network (step S19). Thus, the transmitting unit 2 transmits a new transmission signal in response to the ACK data.

It should be noted that in the transmitting unit 2, the CQI determining section 232 of the RB assignment control section 23 may compare the CQI value with the setting CQI value to generate a CQI comparison result indicating whether or not the CQI value is higher than the setting CQI value. When the CQI value is higher than the setting CQI value, it is shown that the channel quality is good, and when the CQI value is the setting CQI value or less, it is shown that the channel quality is poor. The rate matching section 22 performs the following process on the basis of the reassignment instruction from the RB assignment control section 23 and the CQI comparison result.

Figure 4:
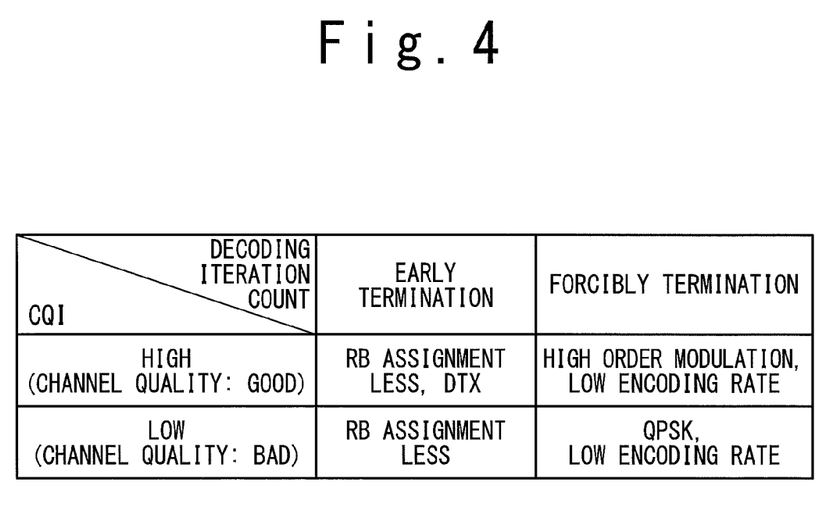
FIG. 4 illustrates an example of a relation between a CQI comparison result and the number of times of iteration of decoding in the multicarrier mobile communication system according to the exemplary embodiment of the present invention.

That is, as shown in FIG. 4, when the channel quality is poor, the rate matching section 22 assigns the resources of the first code block group of the N code blocks of the transmission signal from the first resources to the second resources (the RB assignment is small) in response to a reassignment instruction, and the modulating section 24 applies the AMC to the transmission signal to transmit the transmission signal to the receiving unit 1 via the radio network. In addition, the rate matching section 22 assigns the resources of the second code block group of the N code blocks of the transmission signal from the first resources to the third resources (the encoding rate is low), and the modulating section 24 applies Quadrature Phase Shift Keying (QPSK) to the transmission signal as the modulation system to which the AMC is applied to transmit the transmission signal to the receiving unit 1 via the radio network.

For example, as shown in FIG. 4, when the channel quality is good, the rate matching section 22 assigns the resources of the first code block group of the N code blocks of the transmission signal from the first resources to the second resources (the RB assignment is small) in response to the reassignment instruction, and the modulating section 24 applies Discontinuous Transmission (DTX) to the transmission signal as the application of the AMC to transmit the transmission signal to the receiving unit 1 via the radio network. In addition, the rate matching section 22 assigns the resources of the second code block group of the N code blocks of the transmission signal from the first resources to the third resources (the coding rate is low), and the modulating section 24 applies a high-order modulation to the transmission signal as the modulation system to which the AMC is applied to transmit the transmission signal to the receiving unit 1 via the radio network.

From the above descriptions, according to the multicarrier mobile communication system according to the exemplary embodiment of the present invention, the transmission signal is retransmitted by decreasing the size (the number of bits) of the first code block group. Therefore, there is an effect to improve the efficiency per retransmission even when the number of error bits is few.

In addition, according to the multicarrier mobile communication system according to the exemplary embodiment of the present invention, the transmission signal is retransmitted by increasing the size (the number of bits) of the second code block group. Therefore, when the number of error bits is many, there is an effect to improve the efficiency per retransmission by flexibly assigning the resources so as to terminate the decoding in the next retransmission.

In addition, the present invention also has an effect to improve a throughput of the entire system by improving the efficiency per retransmission and an effect to enhance a flexibility of scheduling of the system by allowing mapping of other channels to available resources.

In addition, according to the multicarrier mobile communication system according to the exemplary embodiment of the present invention, by using the CQI value in the transmitting unit 2, it is possible to dynamically change a modulation system and a coding rate during communication in response to an operational environment such as a radio wave condition. Thus, it is possible to improve a communication rate.

Further, according to the present invention, the case that the number of times of iteration of decoding of the N code blocks itself is transmitted as feedback data in the receiving unit has been described. However, the present invention is not necessarily limited to this. It is possible to transmit an identifier (the data representing the first code block group) indicating whether or not the early termination of iteration is performed to the N code blocks and to transmit an identifier (the data representing the second code block group) indicating whether or not the iterative decoding is forcibly terminated to the N code blocks.

In addition, according to the present invention, the case that only a time resource and a frequency resource exist as radio resources has been described. However, the present invention is not necessarily limited to this. If code multiplexing is applied in addition to time multiplexing and frequency multiplexing, a code resource is obtained as a radio resource. Therefore, it is possible to apply the present invention as a target of scheduling including the code resource.

Further, the case that the present invention is applied to the downlink channel has been described above. However, the present invention is not necessarily limited to this. It is also possible to apply the present invention to a multicarrier radio communication system to apply an OFDMA system to an access system.

Referring to the exemplary embodiment, although the present invention is described as above, the present invention is not limited to the above-described exemplary embodiment. Various modifications that are understandable for a person skilled in the art will be possible in the constitution and the details of the present invention within a scope of the present invention.

The invention claimed is:

1. A multicarrier mobile communication system comprising:
a transmitting unit and a receiving unit which are connected with a radio network,
wherein said transmitting unit comprises:
a coding section configured to divide a transmission data into a plurality of code blocks, and encode each of the plurality of code blocks to generate a transmission signal; and
a transmitting section configured to transmit the transmission signal,
wherein said receiving unit comprises:
a receiving section configured to receive the transmission signal as a reception signal,
wherein when there is an error in the said reception signal, said receiving section transmits a retransmission request feedback data, which contains a NACK data indicating that there is an error in the transmission signal and a data indicating a first code block group, to the said transmitting unit,
wherein first resources are assigned to each of the plurality of code blocks of the transmission signal,
wherein said transmitting section assigns resources of the first code block group of a plurality of code blocks of the transmission signal to second resources which are different from the first resources, based on the retransmission request feedback data, and retransmits the transmission signal to said receiving unit,
wherein said receiving unit further comprises:
a decoding section configured to perform iterative decoding of an error correction decoding and error detection to each of a plurality of code blocks of the reception signal,
wherein said decoding section terminates the iterative decoding to a first code block group, in which an error has not been detected before a first setting number of times of iteration, among the plurality of code blocks of the reception signal,
wherein said transmitting section assigns resources of the first code block group of a plurality of code blocks of the transmission signal to second resources which are fewer than for the first resources,
wherein said receiving unit further comprises:
an iteration count recording section configured to record decoding iteration counts as the numbers of times of iterative decoding to the plurality of code blocks of the reception signal, respectively,
wherein the retransmission request feedback data further includes a data indicating the decoding iteration counts,
wherein the decoding iteration counts data includes a data indicating the first code block group, and
wherein said transmitting section:
compares each of the decoding iteration counts indicated by the decoding iteration counts data with the first setting count to select a first decoding iteration count group which is fewer than the first setting iteration count from the plurality of decoding iteration counts,
assigns the resources of the first code block group corresponding to the first decoding iteration count group among the plurality of code blocks of the transmission signal from the first resources to the second resources, and
retransmits the transmission signal to said receiving unit.

2. A transmitting unit comprising:
a coding section configured to divide a transmission data into a plurality of code blocks, and encode each of the plurality of code blocks to generate a transmission signal; and
a transmitting section configured to transmit the transmission signal,
wherein first resources are assigned to each of a plurality of code blocks of the transmission signal, and
wherein said transmitting section assigns resources of a first code block group of the plurality of code blocks of the transmission signal to second resources which are different from the first resources, based on a retransmission request feedback data, and retransmits the transmission signal to a receiving unit,
wherein said transmitting section assigns resources of the first code block group of a plurality of code blocks of the transmission signal to second resources which are fewer than for the first resources,
wherein said transmitting section:
compares each of the decoding iteration counts indicated by the decoding iteration counts data with the first setting count to select a first decoding iteration count group which is fewer than the first setting iteration count from the plurality of decoding iteration counts, assigns the resources of the first code block group corresponding to the first decoding iteration count group among the plurality of code blocks of the transmission signal from the first resources to the second resources, and retransmits the transmission signal to said receiving unit.

3. A receiving unit comprising:

a receiving section configured to receive the transmission signal as a reception signal; and a decoding section configured to perform iterative decoding of an error correction decoding and error detection to each of a plurality of code blocks of the reception signal, wherein said decoding section terminates the iterative decoding to a first code block group, in which an error has not been detected before a first setting number of times of iteration, among the plurality of code blocks of the reception signal, wherein when there is an error in the said reception signal, said receiving section transmits a retransmission request feedback data, which contains a NACK data indicating that there is an error in the transmission signal and a data indicating the first code block group, to the a transmitting unit, and wherein first resources are assigned to each of the plurality of code blocks of the transmission signal, resources of the first code block group of a plurality of code blocks of the transmission signal are assigned to second resources which are fewer than for the first resources, based on the retransmission request feedback data, wherein said receiving unit further comprises:

a decoding section configured to perform iterative decoding of an error correction decoding and error detection to each of a plurality of code blocks of the reception signal, wherein said decoding section terminates the iterative decoding to a first code block group, in which an error has not been detected before a first setting number of times of iteration, among the plurality of code blocks of the reception signal, wherein said receiving unit further comprises:

an iteration count recording section configured to record decoding iteration counts as the numbers of times of iterative decoding to the plurality of code blocks of the reception signal, respectively, wherein the retransmission request feedback data further includes a data indicating the decoding iteration counts, wherein the decoding iteration counts data includes a data indicating the first code block group.

4. A multicarrier mobile communicating method comprising:

dividing a transmit data into a plurality of code blocks;

encoding each of the plurality of code blocks to generate a transmission signal;

transmitting the transmission signal from a transmitting unit to a receiving unit;

receiving the transmission signal as a reception signal;

when there is an error in the reception signal, transmitting a retransmission request feedback data which contains a NACK data indicating that there is an error in the transmission signal, and a data indicating a first code block group to the transmitting unit, wherein first resources are assigned for each of the plurality of code blocks of the transmission signal;

assigning resources of the first code block group of the plurality of code blocks of the transmission signal to second resources which are different from the first resources, based on the retransmission request feedback data;

retransmitting the transmission signal to the receiving unit, performing an iterative decoding of iteratively executing an error correction decoding and error detection to each of the plurality of code blocks of the reception signal, terminating the iterative decoding to a first code block group in which an error has not been detected before a first setting iteration count, among the plurality of code blocks of the reception signal, assigning resources of the first code block group of the plurality of code blocks of the transmission signal to second resources which are fewer than the first resources, and recording decoding iteration counts as the numbers of times of iterative decoding to the plurality of code blocks of the reception signal, respectively, wherein the retransmission request feedback data further comprises a data indicating the decoding iteration counts, wherein the decoding iteration counts data includes a data indicating the first code block group, and wherein said assigning comprises:

comparing each of the decoding iteration counts indicated by the decoding iteration counts data with the first setting count to select a first decoding iteration count group which is fewer than the first setting iteration count, from the plurality of decoding iteration counts; and assigning the resources of the first code block group corresponding to the decoding iteration count group among the plurality of code blocks of the transmission signal to the second resources from the first resources.

* * * * *